US012238468B2

(12) United States Patent
Schillebeeckx et al.

(10) Patent No.: US 12,238,468 B2
(45) Date of Patent: Feb. 25, 2025

(54) MICROPHONE SYSTEM AND METHODS

(71) Applicant: Freedman Electronics Pty Ltd, Silverwater (AU)

(72) Inventors: Pieter Schillebeeckx, Silverwater (AU); Joost ter Laak, Silverwater (AU)

(73) Assignee: Freedman Electronics Pty Ltd, Silverwater (AU)

( * ) Notice: Subject to any disclaimer, the term of this patent is extended or adjusted under 35 U.S.C. 154(b) by 0 days.

(21) Appl. No.: 18/296,242

(22) Filed: Apr. 5, 2023

(65) Prior Publication Data

US 2023/0247337 A1 Aug. 3, 2023

Related U.S. Application Data

(62) Division of application No. 17/183,173, filed on Feb. 23, 2021, now Pat. No. 11,671,734.

(51) Int. Cl.
*H01Q 9/26* (2006.01)
*G06F 16/60* (2019.01)
*H04R 1/04* (2006.01)
*H04R 3/00* (2006.01)

(52) U.S. Cl.
CPC ............ *H04R 1/04* (2013.01); *G06F 16/60* (2019.01); *H01Q 9/26* (2013.01); *H04R 3/00* (2013.01); *H04R 2420/07* (2013.01)

(58) Field of Classification Search
CPC ............ H01Q 1/243; H01Q 9/26; H01Q 9/42; H01Q 21/24; H01Q 9/44; H01Q 9/285; H01Q 9/0414; H01Q 9/065; H01Q 19/108; H01Q 1/241; H01Q 1/242
See application file for complete search history.

(56) References Cited

U.S. PATENT DOCUMENTS

| | | | |
|---|---|---|---|
| 8,077,110 B2 * | 12/2011 | Soler Castany | H01Q 9/0407 343/702 |
| 10,033,100 B1 * | 7/2018 | Chayat | H01Q 9/20 |
| 2005/0153756 A1 * | 7/2005 | Sato | H01Q 5/371 455/575.1 |
| 2017/0289664 A1 * | 10/2017 | St Clair | H04R 1/326 |

\* cited by examiner

*Primary Examiner* — David E Lotter
(74) *Attorney, Agent, or Firm* — Lathrop GPM LLP; Alex Shtraym

(57) ABSTRACT

The invention relates generally to a wireless microphone system and methods. The system may include one or more antennas, such as a monopole and dipole antennas, arranged within a housing. The housing may include a circuit boarding having a ground plane. The circuit board may be connected to a microphone configured to protrude from an opening of the housing. Further, a windshield including a bayonet-type connector may removably mount with a mount on the housing. Advantageously, the system may be configured to provide noise dampening and facilitate linking with other devices more efficiently and effectively.

10 Claims, 16 Drawing Sheets

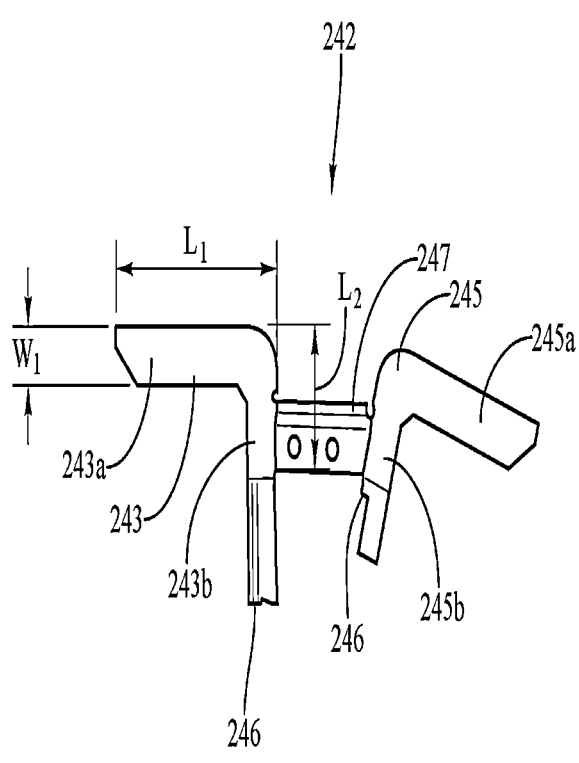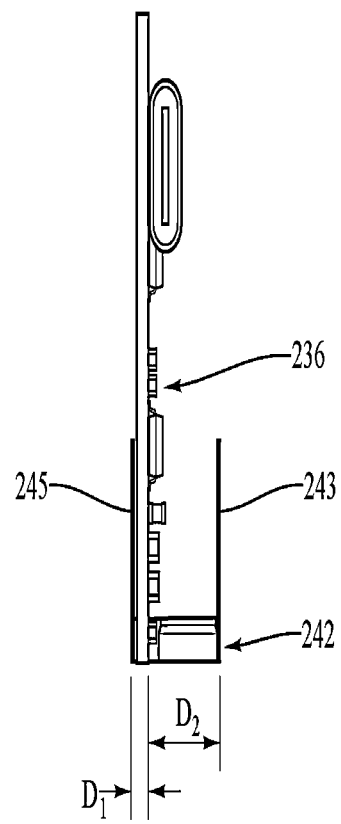
FIG. 4B
FIG. 4C

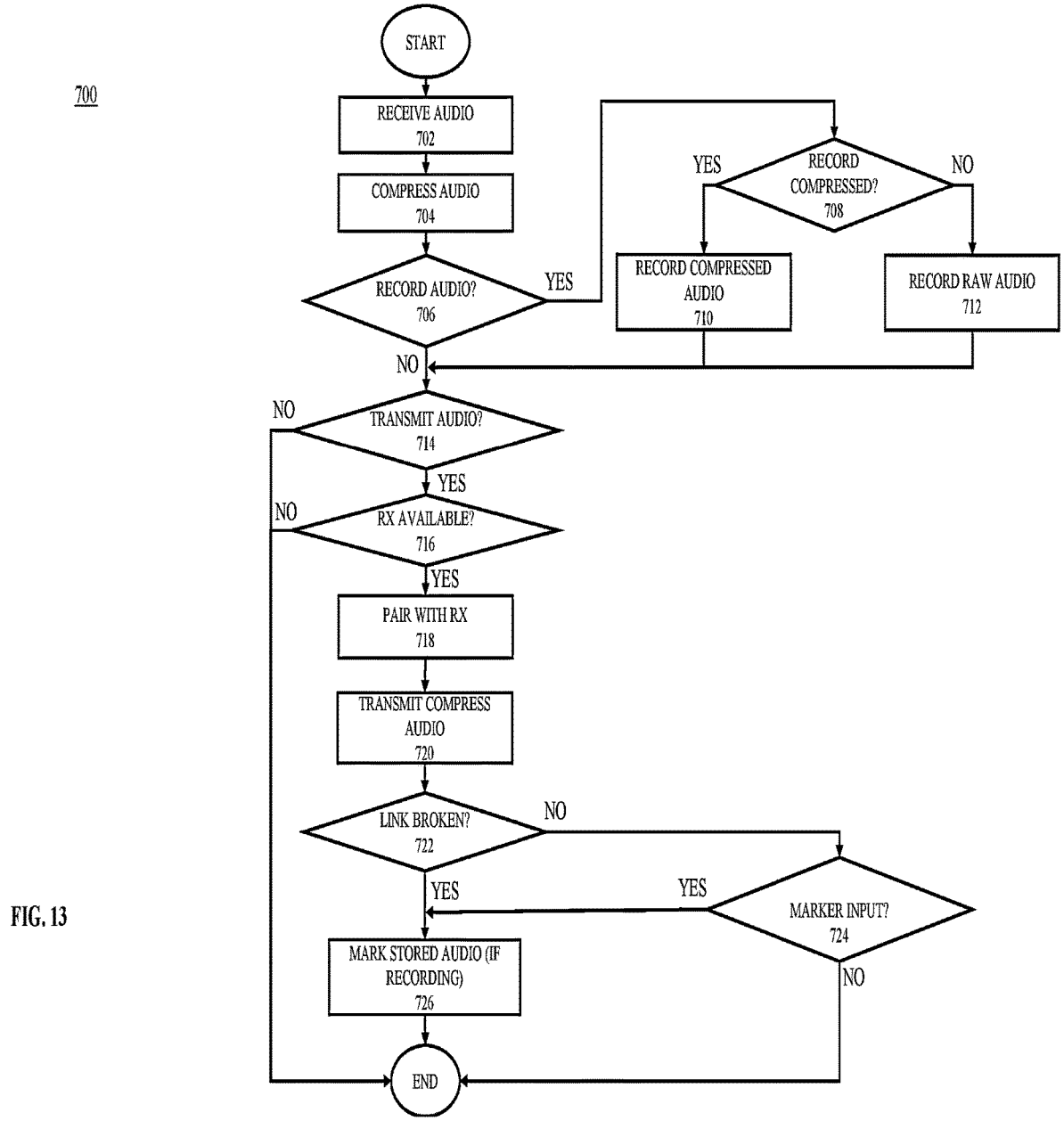

MICROPHONE SYSTEM AND METHODS

CROSS-REFERENCE TO RELATED APPLICATIONS

This application is a divisional of U.S. patent application Ser. No. 17/183,173, filed Feb. 23, 2021, and which application is incorporated herein by reference. To the extent appropriate, a claim of priority is made to the above-disclosed application.

FIELD OF THE INVENTION

The invention relates generally to a wireless microphone system and methods and more particularly to a microphone antenna system for dynamically recording and transmitting audio.

BACKGROUND

In some applications, wireless systems are used to transmit audio to a remote device. For example, wireless microphone systems are commonly used in film, newsgathering, and gaming.

Conventional wireless microphone systems often include an audio receiver that receives audio data from one or more wireless transmitters. Various forms of analog to digital conversion and data compression are known to help facilitate transmission of audio data. Typically, wireless applications require long-term operation over minutes, hours, days, and months, and they require rapid, reliable, handling of large amounts of data.

High speed transmission of audio data, i.e., close to real time (low latency) is desirable, especially for synchronization of audio with video, but it has been difficult to obtain, and, with some of the typical systems and methods, practically impossible to achieve.

Moreover, it is often difficult to provide desirable size and weight in portable systems along with good performance in long-term operation because, among other limitations, transmitters typically are battery powered.

Systems such as disclosed in U.S. Pat. No. 9,336,307 have met with success in professional filmmaking, however, their power requirements, including RF power, complexity, and cost can make them impractical for many users.

The Rode Wireless Go system, developed, made, and sold by Applicant, has been popular with hobbyists and professionals alike for its compact size, low power, and ease of use, however, it has certain limitations, such as limited transmission range.

One accessory sold with the latter system is a DeadCat synthetic fur windshield for shielding the transmitter from wind noise. That windshield has been very popular, and it has spawned many imitations, however, many users have had difficulty keeping the windshield securely attached, i.e., from falling off the transmitter.

In addition, conventional microphone systems often experience a drop in signal due to interference. Efforts to reduce and to remedy dropouts have been made, but they have not been entirely successful, and they have tended to be overly complicated. Improvements to the range and the handling of audio transmission in and between receiver and transmitter would provide a variety of advantages to users.

Therefore, there is a need for a compact wireless microphone system that facilitates dynamically recording and transmitting audio. The present invention satisfies this need.

SUMMARY

The invention relates generally to a wireless microphone system and methods and more particularly to a compact wireless microphone system for dynamically recording and transmitting audio.

In one aspect, the system includes a receiver configured to output audio via one or more connector ports. The receiver may be linked to one or more transmitter. Each transmitter may include an antenna and a circuit board including a controller. The controller may be configured to obtain audio data, for example, from a built-in microphone or a wired microphone connected via an input port of the transmitter. In addition, a windshield may be secured to the housing of a transmitter via a bayonet fastener to provide wind noise dampening.

Once audio is received, the controller may record the audio data according to a processing path. A first processing path may include recording the raw audio data. A second processing path may include compressing, via an encoder, the audio data and recording the compressed audio data. Simultaneously, the controller may transmit the compressed audio to the receiver unit.

The controller may further be operative to monitor the wireless link between the transmitter and receiver. In response to detecting a broken connection, the controller may, automatically or in response to a user input, tag or mark the recorded audio to signify a dropout. In addition, the controller may be configured to record a peak audio file, which may be a low resolution signal used to display a waveform corresponding to the recorded data. The waveform may be used to output a visual the audio file on a display. The output of the entire audio waveform allows for more efficient editing of the audio data and any corresponding markings.

The transmission of audio may be via one or more antennas of the transmitter unit. The one or more antennas may be an inverted-F antenna and/or a folded dipole antenna. The folded dipole antenna may include a horizontally polarized antenna array coupled to a vertically polarized antenna array. Moreover, the antenna may be raised a predetermined distance from a ground plane of a circuit board to provide a greater communication range. A slit in the circuit board may receive a portion of the antenna, which may be soldered to a connector element of the circuit board.

While the invention is susceptible to various modifications and alternative forms, specific exemplary embodiments thereof have been shown by way of example in the drawings and have herein been described in detail. It should be understood, however, that there is no intent to limit the invention to the particular embodiments disclosed, but on the contrary, the intention is to cover all modifications, equivalents, and alternatives falling within the scope of the invention as defined by the appended claims.

BRIEF DESCRIPTION OF THE DRAWINGS

Embodiments are illustrated by way of example and not limitation in the figures in the accompanying drawings, in which like references indicate similar elements and in which:

FIG. 4B illustrates a folded dipole antenna of the transmitter unit;

FIG. 4C illustrates a circuit board and dipole antenna of the transmitter unit;

FIG. 13 is a flow chart illustrating an exemplary operation for dynamically recording and transmitting audio.

DETAILED DESCRIPTION OF THE INVENTION

The invention relates generally to a wireless microphone system and methods and more particularly to a system and methods for dynamically recording and transmitting audio.

Figure 1A:
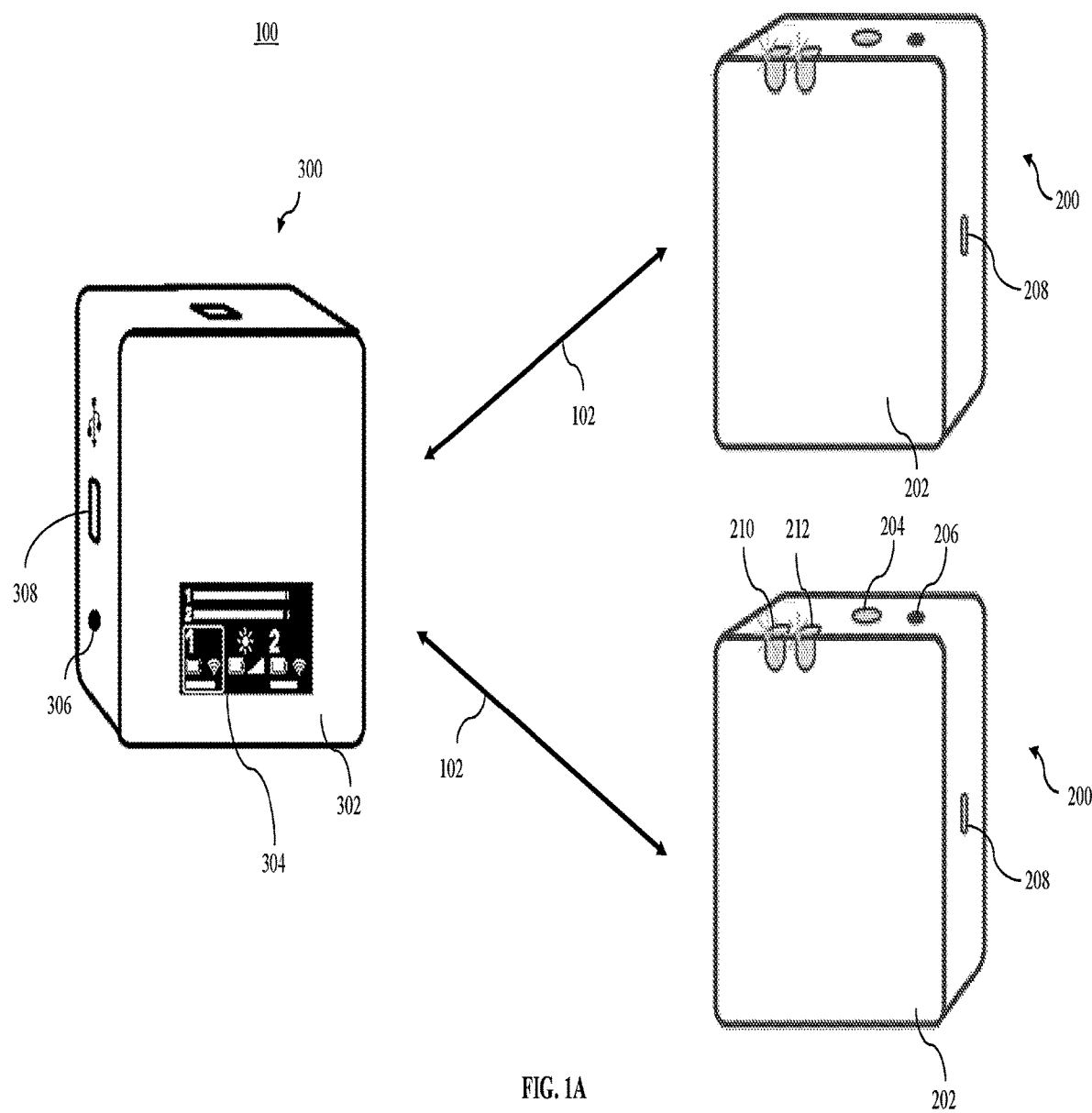
FIG. 1A illustrates an exemplary wireless microphone system including transmitter units and a receiver unit.
Figure 1B:
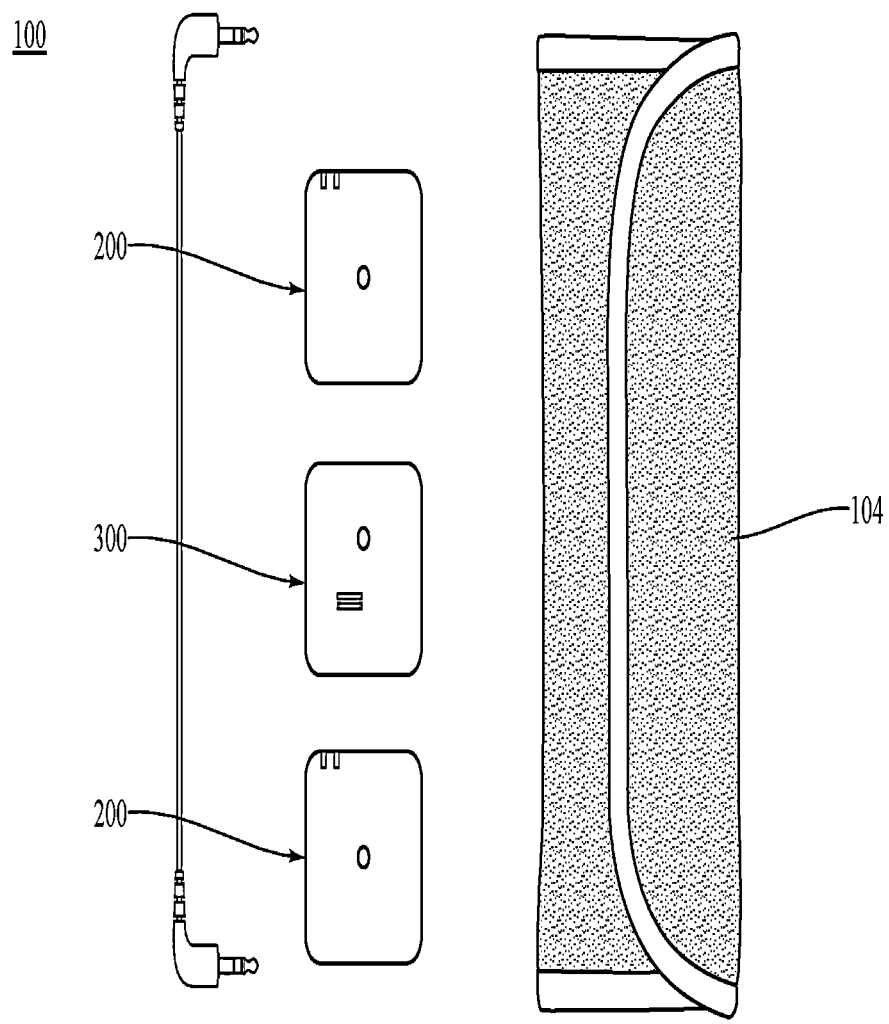
FIG. 1B illustrates the exemplary wireless microphone system of FIG. 1A.

Turning now to the drawings wherein like numerals represent like components, FIGS. 1A and 1B illustrate an exemplary wireless microphone system 100. As shown, wireless microphone system 100 includes at least one transmitter unit 200 and a receiver unit 300. As shown in FIG. 1B, components of wireless microphone system 100 are compact so as to be easily transported and stored, such as within pouch 104.

One or more transmitter units 200 may communicate with receiver unit 300 via a wireless link 106. Wireless link 102 can facilitate data communication over a wireless medium, e.g., Wi-Fi (IEEE 802.21 family standards), Bluetooth® (a family of standards promulgated by Bluetooth SIG, Inc.), 2.4 GHz wireless protocols with 128 bit encryption or other protocols for wireless data communication. Wireless link 106 can be implemented using a combination of hardware (e.g., driver circuits, antennas, modulators/demodulators, encoders/decoders, and other analog and/or digital signal processing circuits) and software components. In some embodiments, wireless link 106 can include near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into transmitter units 200 and receiver unit 300.

1.0 Exemplary Transmitter Unit 200

As illustrated in FIG. 1A, transmitter unit 200 may include a housing 202, a microphone 204, an input port 206, and a connector interface 208. In addition, transmitter unit 200 may include a link indicator 210 and a battery indicator 212, each of which may be a light-emitting diode (LED). Housing 202 may be made of a a thermoplastic material, such as polycarbonate-ABS having a lower carbon content or substantially no carbon content.

Transmitter unit 200 may be a wearable device having a cube-shaped structure. Other structures are contemplated and therefore the possible wearable devices may include a ring, a wristwatch (also referred to as a "smartwatch"), a button or brooch which may include a pin for attaching to clothing, or a patch that may be sewn to, or into, clothing such as a shirt or blouse, etc. Other example wearable devices may include a bracelet, a belt buckle, etc.

Transmitter unit 200 may range from about thirty millimeters to about sixty millimeters in length, and preferably between about forty millimeters and fifty millimeters. In one embodiment, the transmitter unit 200 has an approximate length of about forty-four millimeters.

The height of transmitter unit 200 may range from about thirty millimeters to about sixty millimeters, and preferably between about forty millimeters and fifty millimeters. In other words, it is preferably less than sixty millimeters in height, and still more preferably less than fifty millimeters in height. In one embodiment, the transmitter unit 200 has an approximate height of about forty-five millimeters.

Transmitter unit 200 may range from about ten to about twenty five millimeters in width, and preferably between about fifteen millimeters and twenty millimeters. In other words, it is preferably less than twenty five millimeters in width, and still more preferably less than twenty millimeters in width. In one embodiment, the transmitter unit 200 has an approximate width of about eighteen and a half millimeters.

The weight of transmitter unit 200 may range from about twenty grams to about forty grams, and preferably between about twenty five grams and thirty five grams. In other words, the weight is preferably less than forty grams, and still more preferably less than thirty five grams. In one embodiment, the transmitter unit 200 has an approximate weight of about thirty grams.

1.1 External Components of Transmitter Unit 200

Figure 2A:
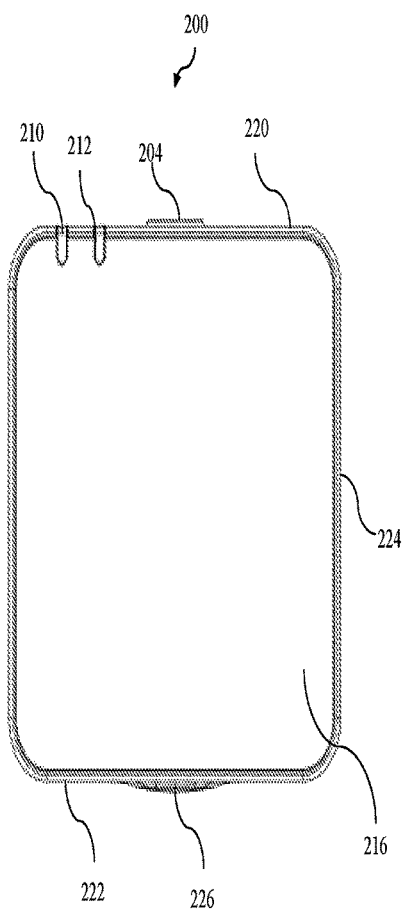
FIG. 2A illustrates a top view of the transmitter unit of FIG. 1.
Figure 2B:
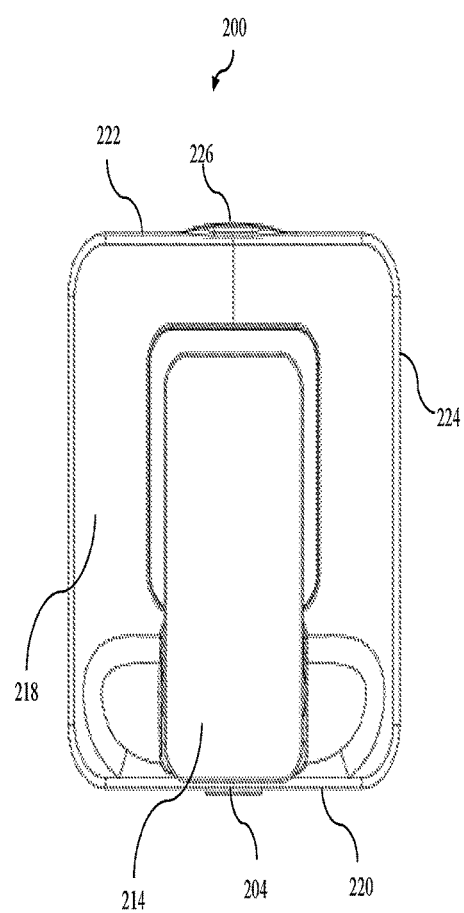
FIG. 2B illustrates a bottom view of the transmitter unit of FIG. 1.
Figure 2C:
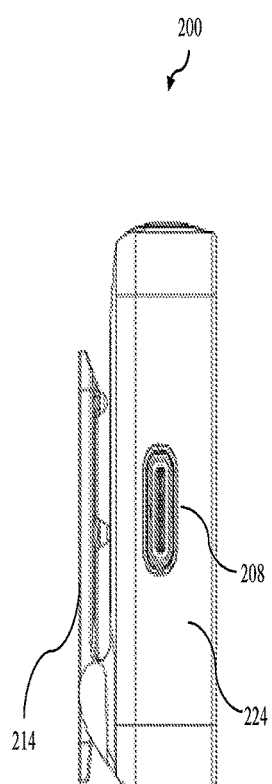
FIG. 2C illustrates a top view of the transmitter unit of FIG. 1.

FIGS. 2A-2C illustrate various views of transmitter unit 200 including a front surface 216, a back surface 218, a top surface 220, a bottom surface 222, and side surfaces 224. FIG. 2A illustrates a top view of transmitter unit 200. Microphone 204 protrudes from a top surface 220 of housing 202. At other end of housing 202, bottom surface 222 of transmitter unit 200 may include a power button 226.

As shown in FIGS. 2B-2C, back surface 218 of transmitter unit may include a clip 214. Clip 214 may be an alligator clip for securing to, for example, an article of clothing, such as a shirt, or a sun visor of a vehicle. While a clip is shown, other releasable connector types are contemplated for securing to such articles.

As shown in FIG. 2C, side surface 224 includes a connector interface 208. Connector interface 208 may communicate with various host devices via a wired communication path, e.g., using Universal Serial Bus (USB), universal asynchronous receiver/transmitter (UART), or other protocols for wired data communication. Such connection may provide for additional advanced features (e.g., playback audio, optimize audio, export or delete recordings, switch between mono and stereo, activate a granular gain control mode, and the like) relating to transmitter unit 200. In some embodiments, connector interface 208 can provide a power port, allowing transmitter unit 200 to receive power, e.g., to charge an internal battery, such as a 3.8V lithium ion battery.

Connector interface 208 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from an external device (not shown) in analog and/or digital formats.

In certain embodiments, connector interface 208 may include a USB device stack. USB device stack may be configured to perform USB Host OS detection by means of heuristic analysis of enumeration sequence. This may enable providing different capabilities and configurations to different operating systems. For example, the system may be configured to avoid exposing an iOS-specific interface, which may otherwise show up on a Window device as lacking a driver. In addition, the USB device stack may facilitate reassigning limited endpoint resources within a USB controller to interfaces relevant to a particular operating system.

Moreover, connector interface 208 may include a USB audio stack. USB audio stack may employ phantom terminal descriptors to, for example, work around unique limitations of certain Android implementations preventing an input-only USB device from working with an Android system audio stack.

1.2 Microphone 204 of Transmitter Unit 200

Figure 3:
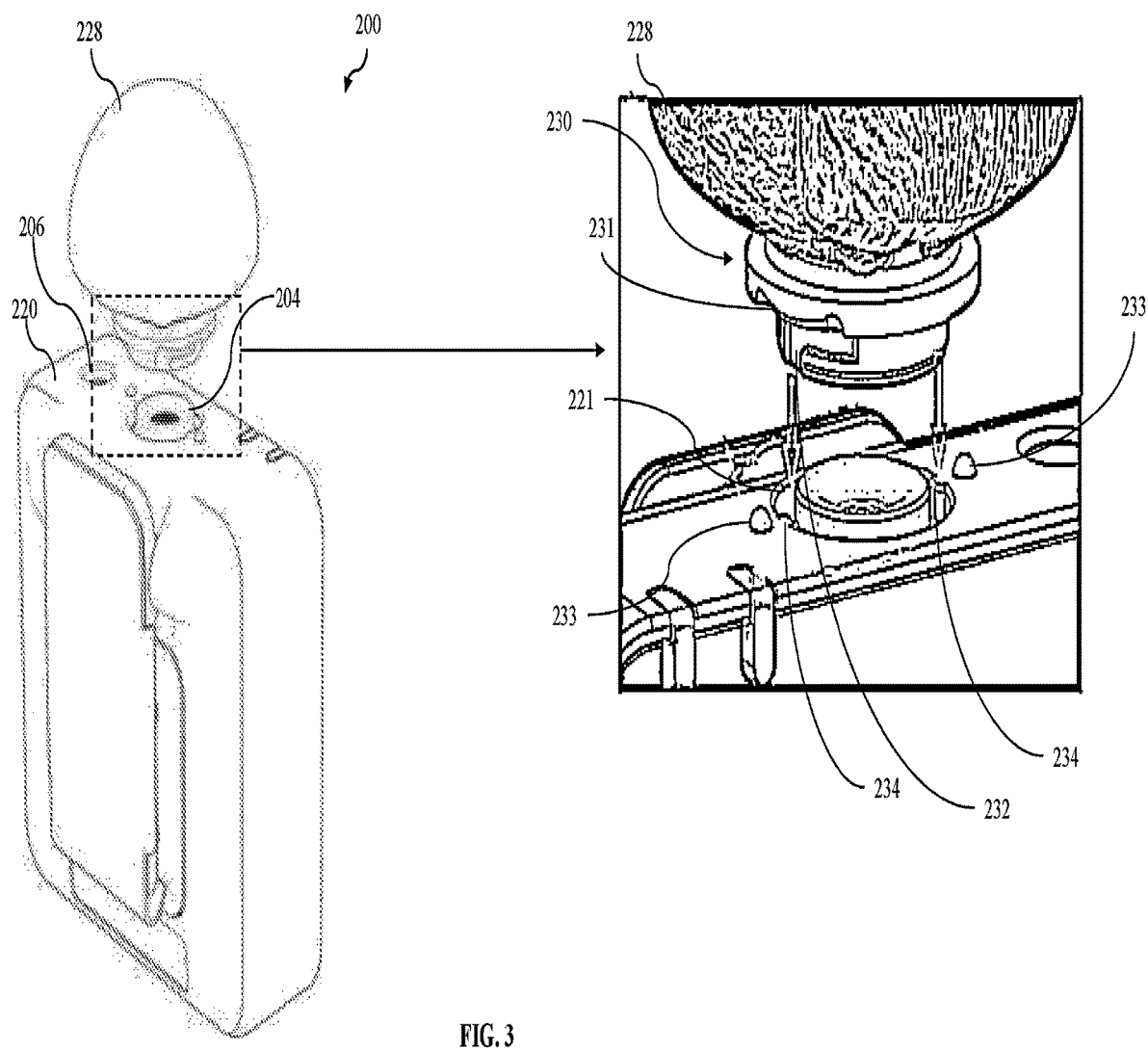
FIG. 3 illustrates a fastening mechanism of the transmitter unit of FIG. 1 for connecting a windshield.

As shown in FIG. 3, transmitter unit 200 may include a microphone 204 protruding from an opening 221 at top surface 220. Examples of microphone 204 may include an omni-directional microphone, cardioid microphone, or supercardioid microphone.

An omni-directional microphone is a microphone with an even or equal response sensitivity to sound from all directions over a full 360° range. As such, the direction response pattern for an omni-directional microphone as a function of location with respect to it is a uniform level, graphically full circle. A cardioid microphone is improved over an omni-directional microphone in that a cardioid microphone has maximum sensitivity in the forward direction and reduced sensitivity to sounds arriving from a side or rear direction with respect to the longitudinal axis of the microphone. A supercardioid microphone has a direction response pattern more attenuated for sounds arriving from a side direction than a cardioid direction response pattern.

As shown, transmitter unit 200 may include an input port 206. Input port 206 may be a 3.5 mm TRS (tip, ring, sleeve) connector for receiving analog audio signals. The input port may be cylindrical in shape and provide multiple channels. For example, input port 206 may include a three- or four-conductor version of the 2.5 mm or 3.5 mm to provide mono (three conductor) or stereo (four conductor) sound and a microphone input. It is noted that transmitter unit 200 is not necessarily limited to the type, size, or configuration of the connector, so long as it is suitable for the system and applications disclosed and described.

1.3 Windshield 228

FIG. 3 further illustrates a windshield 228, which may be mounted on transmitter unit 200. In particular, windshield 228 may be removably mounted around microphone 204 to provide wind noise dampening. Windshield 228 may include an acoustic liner having a first layer and a second layer. First layer may be made of a foam or wind-guard material and can be used to fill the interior of windshield 228. Second layer may encompass the first layer and may be made of artificial, synthetic, faux fur or other suitable material, with relatively long, flexible fibers, while remaining acoustical transparency, including any backing material or fabric, which may be a thin, open material, so soundwaves travel easily through it. The faux fur provides soft, absorptive, movable surfaces, such that as wind contacts the fur, the fur moves, absorbing some of the wind energy, with many strands of soft fur, presenting a surface area more than 10 times the device surface facing the fur, and much more flexible. These strands of fur produce micro-turbulence and absorb energy silently and at a distance from the microphone.

For the system disclosed herein, the fibers may range in length from about 1 mm to about 50 mm, preferably from about 1 mm to about 30 mm, with the strands being shorter at the outside and increasing in length toward the center of the windshield. The faux fur may be made of any acceptable composition, such as polymers, examples being polyester, acrylic, or the like, including blends, having the properties described above, as will be understood by those of skill in the art.

Further, windshield 228 may include a fastener 230 made of a silicone material or any other suitable material to form an air-tight seal between windshield 228 and microphone 204.

As shown, fastener 230 may be a bayonet fastener including two or more arced ridges 231 and two or more L-shaped female slots 232. Arced ridges 231 may be adapted to receive corresponding ball locks 233 extending from top surface 220 of housing 202. In operation, arced ridges 231 are lowered right down against ball locks 233 and caused to turn so that the ball locks 233 engage arced ridges 231.

Female slots 232 may be adapted to receive corresponding two or more bayonet pins 234 on housing 202. In operation, the female slots 232 are lowered right down against pins 234 and caused to turn so that the pins 234 engage the slots 232.

Slots 232 may be spaced across opening 221 having a diameter between about ten millimeters and about millimeters and in one embodiment may have a diameter of about sixteen millimeters. Length of each slot 232 is between about five millimeters and about ten millimeters and in one embodiment may have a length of about seven millimeters. Pins 234 may be between about two mm and about seven millimeters long and in one embodiment may have a length of about four millimeters. In other embodiments, it is contemplated that the windshield may have pins and the housing may have slots.

1.4 Internal Components of Transmitter Unit 200

Figure 4A:
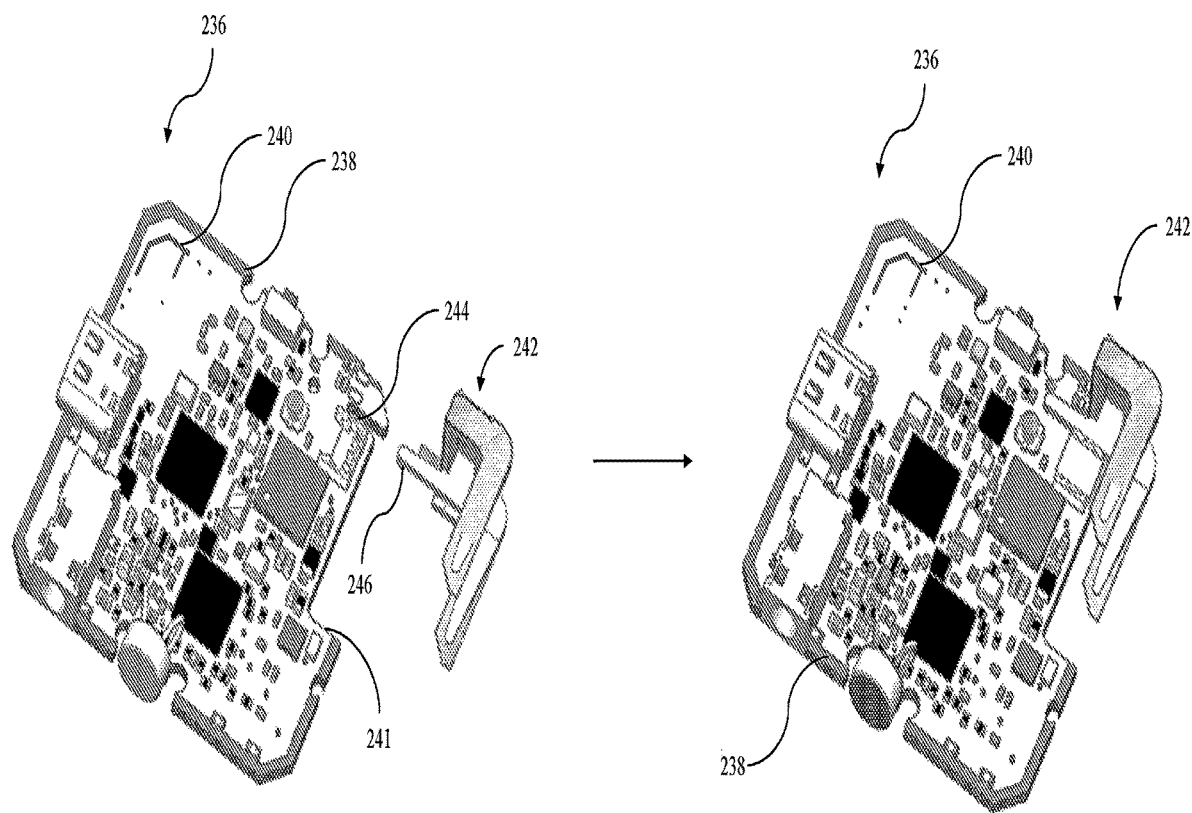
FIG. 4A illustrates a circuit board and antenna of the transmitter unit of FIG. 1.
Figure 5:
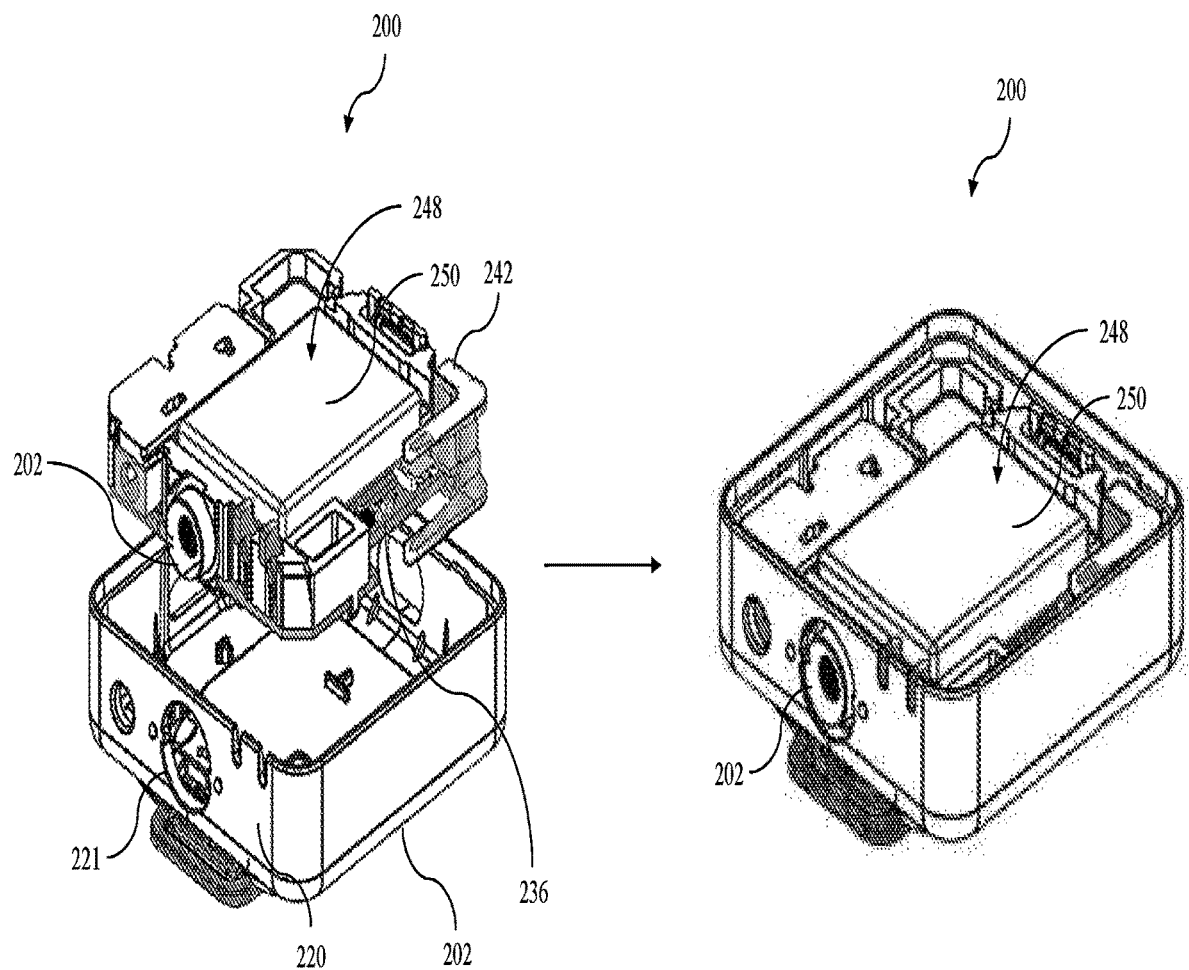
FIG. 5 illustrates mounting the circuit board and antenna within a housing of the transmitter unit of FIG. 1.

FIGS. 4A, 4C, 5 illustrate a circuit board 236 of transmitter unit 200. Circuit board 236 may have a thickness ranging between about half a millimeter and two millimeters, and preferably be about one millimeter. In other words, circuit board 236 preferably may have a thickness less than two millimeters.

Circuit board 236 includes a ground plane 238. Circuit board 236 may be a printed circuit board (PCB) or a flexible PCB. Flexible PCBs can be entirely flexible or can contain both flexible and rigid regions, where the rigid regions can be made of standard, rigid PCB materials with connections to the flexible portions of the overall PCB.

The flexible substrate can provide electrical traces, electrical connections and/or electrical pads on one or both primary surfaces of the flexible substrate. Examples of components that may communicate over one or more communication buses or signal lines of circuit board 236 may include a memory (which optionally includes one or more computer readable storage mediums), memory controller, one or more processing units, peripherals interface, RF circuitry, audio circuitry, microphone, input/output (I/O) subsystem, other input or control devices, and external ports.

Circuit board 236 may be rectangular with rounded corners and include a cut-out portion 241 for an antenna 242, as described below. In one embodiment, circuit board 236 is substantially square. Each linear dimensions of circuit board 236 may range from about twenty millimeters to about sixty millimeters in length, and preferably between about thirty millimeters and about fifty millimeters, and more preferably about forty millimeters. In other words, each linear dimension is preferably less than about sixty millimeters and still more preferably less than about fifty millimeters. Each linear dimension of circuit board 236 may correspond to and substantially fill the corresponding linear dimensions of the housing 202. Thus, circuit board 236 may fill at least approximately 90% of the corresponding internal linear dimensions of housing 202.

1.5 Antennas of Transmitter Unit 200

Transmitter unit 200 may include one or more antennas configured to, for example, transmitting an audio signal to receiver unit 300. Antennas of transmitter unit 200 may be made of a copper and/or thermoplastic material, such as polyvinyl chloride (PVC) having a lower carbon content or substantially no carbon content.

The one or more antennas may be a monopole antenna 240 and a folded dipole antenna 242. Antennas 240, 242 may be of different polarizations (horizontal/vertical) for adapting without losing performance due to the physical orientation of the transmitter unit 200. The system may use a diversified antenna approach to actively scan and select the antenna that receives the strongest signal and operates within the least congested frequency band, such as the 2.4 GHz band.

Monopole antenna 240 may be an inverted-F antenna running parallel to ground plane 238 and grounded at one end. The polarization of monopole antenna 240 may be vertical, and the radiation pattern may be roughly torus or donut shaped.

As shown, circuit board 236 may include a slit 244 for receiving a dipole antenna 242. More specifically, dipole antenna 242 may be configured to fit inside slit 244 formed within circuit board 236. It is contemplated that dipole antenna 242 may include connector portions 246 that soldered to, for example, corresponding regions on either side of circuit board 236.

Dipole antenna 242 may be disposed substantially opposite connector ports of the transmitter unit 200 and on an edge of circuit board 236.

As shown in FIG. 4B, folded dipole antenna 242 may comprise of a first conductive element 243 and a second conductive element 245 connected by a coupler 247.

As shown in FIGS. 4A-4C, dipole antenna 242 may be folded so that L-shaped conductive elements 243, 245 are positioned on either side of ground plane 238, thereby conserving space within transmitter unit 200 while maximizing antenna size.

Each conductive element 243, 245 may be L-shaped and may include a tapered end. As shown, width (shown as $W_1$) of tapered end may range between about three millimeters and about five millimeters, and preferably between about three and a half millimeters and four millimeters, and in one embodiment may be about three and seven tenths millimeters.

As shown in FIG. 4B, horizontal legs 243a, 245a of each conductive element 243, 245 of folded dipole antenna 242 may have a length (shown as $L_1$) ranging between about ten millimeters and about thirty millimeters, and preferably between about fifteen millimeters and twenty millimeters. In one embodiment, the length $L_1$ is about seventeen millimeters. Each leg 243a, 245a may be positioned substantially parallel to ground plane 238 and each may be spaced a predetermined distance above or below ground plane 238.

The distance between legs 243a and 245a, when folded and positioned with respect to ground plane 238, may range between about five millimeters and about fifteen millimeters, and preferably be about ten millimeters. Cut-out 241 may eliminate circuit board material between legs 243a, 245a and thereby reduce interference.

As shown in FIG. 4B, vertical leg 243b, 245b of each conductive element 243, 245 of folded dipole antenna 242 may have a length (shown as $L_2$) ranging between about five millimeters and fifteen millimeters, and preferably between about seven millimeters and ten millimeters. In one embodiment, the length $L_2$ is about eight and a half millimeters. Each leg 243b, 245b may be positioned substantially normal to ground plane 238 and extends a predetermined distance from ground plane 238.

Folded dipole antenna 242 may be a polarized antenna array. It is contemplated that antenna 242 may include a plurality of horizontally polarized antenna arrays coupled to a vertically polarized antenna array. The vertically polarized antenna array may generate a radiation pattern substantially perpendicular to a radiation pattern generated by one of the horizontally polarized antenna arrays.

The arrangement of dipole antenna 242 provides for a better link in all directions and a greater communication range, substantially greater than 250 feet (about 75 meters) and in certain embodiments about 650 feet (about 200 meters) of range in, for example, line of sight conditions. In other words, the range of transmission provided by folded dipole antenna 242 and system 100 is preferably between about 100 feet (about 30 meters) and about 1500 feet (about 460 meters), still more preferably between about 250 feet (about 75 meters) and about 1,000 feet (about 300 meters).

As illustrated in FIG. 4C, folded dipole antenna 242 in transmitter unit 200 may be decoupled (i.e., positioned at a height) from either side of ground plane 238. The distance between dipole antenna 242 and ground plane 238 may range between about one millimeter and about ten millimeters. In one embodiment, folded dipole antenna 242 may be positioned on circuit board 236 such that first conductive element 243 of dipole antenna 242 may be distanced (shown as $D_2$) between about seven millimeters and about eight millimeters, in one embodiment about seven and a half millimeters, from ground plane 238, and second conductive element 245 of dipole antenna 242 may be distanced (shown as $D_1$) between about one millimeter and about two millimeters, in one embodiment about one and a half millimeters, from ground plane 238. The separation from ground plane 334 may decrease signal loss and thereby lower the rate of dropout error.

1.6 Power System of Transmitter Unit 200

As shown in FIG. 5, a power system 248 is mounted within housing 202 of transmitter unit 200. Power system 248 may be used for powering the various components of transmitter unit 200. Power system 248 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in transmitter unit 200.

A battery 250 of transmitter unit 200 may be a lithium ion polymer rechargeable battery. In certain embodiments, battery 250 is a 3.8V 350 mAh 1.33 Wh Tenergy Model 34363 T battery.

A height of battery 250 may range between about fifteen millimeters and thirty millimeters, and preferably between about twenty millimeters and twenty five millimeters. In one embodiment, the height of battery 250 is about twenty two millimeters.

A length of battery 250 may range between about ten millimeters and twenty five millimeters, and preferably between about fifteen millimeters and twenty millimeters. In one embodiment, the height of battery 250 is about eighteen millimeters.

2.0 Exemplary Receiver Unit 300

Referring back to FIG. 1, wireless microphone system 100 includes a receiver 300. Receiver 300 may include a housing 302, a display 304, an output port 306, and a connector interface 308. Receiver unit 300 may be a wearable device, like transmitter unit 200, or structured for attaching to an external device, as detailed below. Housing 302 may be made of a thermoplastic material, such as polycarbonate-ABS having a lower carbon content or substantially no carbon content.

Receiver unit 300 may range from about thirty millimeters to about sixty millimeters in length, and preferably between about forty millimeters and fifty millimeters. In one embodiment, the receiver unit 300 has an approximate length of about forty-four millimeters. In other words, receiver unit 300 may have a length less than sixty millimeters and preferably less than fifty millimeters.

The height of receiver unit 300 may range from about thirty millimeters to about sixty millimeters in length, and preferably between about forty millimeters and fifty millimeters. In one embodiment, the receiver unit 300 has an approximate height of about forty-six millimeters.

Receiver unit 300 may range from about ten to about twenty five millimeters in width, and preferably between about fifteen millimeters and twenty millimeters. In other words, receiver unit 300 may have a width less than twenty five millimeters and preferably less than twenty millimeters. In one embodiment, the receiver unit 300 has an approximate width of about eighteen and a half millimeters.

The weight of receiver unit 300 may range from about twenty grams to about forty grams, and preferably between about twenty five grams and thirty five grams. In other words, weight may be less than forty grams and preferably less than thirty five grams. In one embodiment, the receiver unit 300 has an approximate weight of about thirty grams.

2.1 External Components of Receiver Unit 300

Figure 6A:
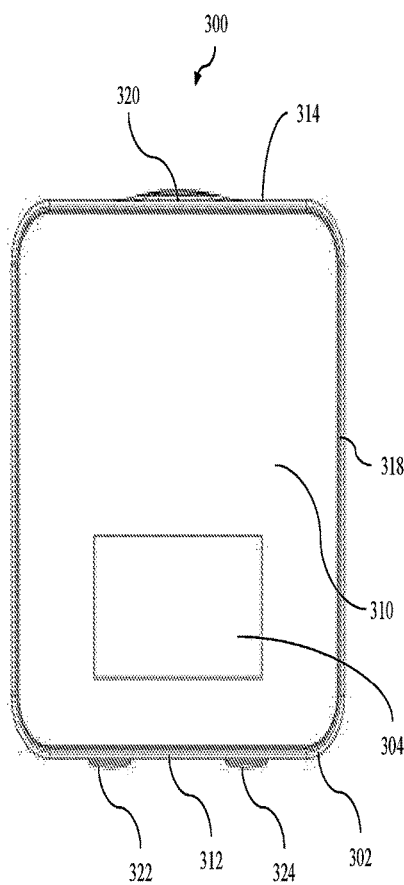
FIG. 6A illustrates a top view of the receiver unit of FIG. 1.
Figure 6B:
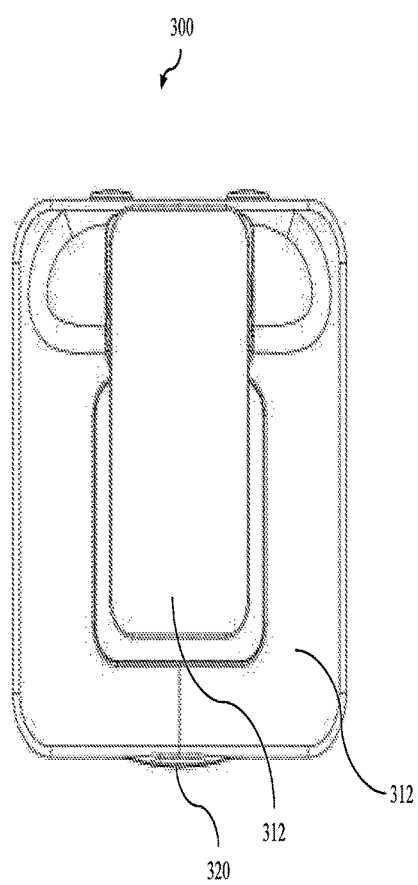
FIG. 6B illustrates a bottom view of the receiver unit of FIG. 1.
Figure 6C:
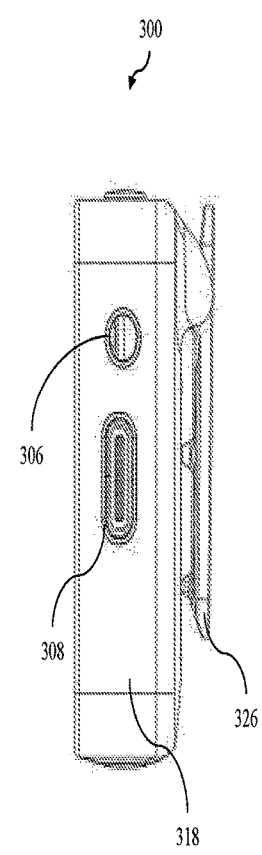
FIG. 6C illustrates a top view of the receiver unit of FIG. 1.

FIGS. 6A-6C illustrate various views of receiver unit 300 including a front surface 310, a back surface 312, a top surface 314, a bottom surface 316, and side surfaces 318.

FIG. 6A illustrates a top view of transmitter unit 300. As shown, front surface 332 includes display 304. Display 304 may be a liquid crystal display, an organic light-emitting diode display, an electrophoretic display, an electrowetting display, or any other suitable type of display. Display 304 may be a touch screen display (e.g., a display that incorporates touch sensor) or may be insensitive to touch.

Display 304 may output various types of contents, such as an image, a moving picture, text, and the like. As shown in FIG. 1, display 304 may be configured to output certain information relating to the transmitter unit 200 and receiver unit 300 including, but not limited to, battery levels, signal strength, audio input levels, audio channels, and the like.

Further, receiver unit 300 include various selectable buttons relating to features of the system 100. Top surface 314 includes a power button 320 for turning on and off the receiver unit 300.

Bottom surface 316 of receiver unit 300 includes a control button 322 and a link button 324. Control button 322 may reduce the decibel output from the receiver unit 300 to an external device. For example, a user may press control button 322 to engage a −24 dB pad, then upon a second press reduce the attenuation to just a −12 dB pad (midway between −24 dB and 0 dB) then pressing again will bring it back to the full output level (no attenuation) at the 0 dB setting.

Moreover, a user may activate an advanced mode for additional granular gain control, which may include adjusting from 0 dB all the way down to −30 dB in, for example, −3 dB increments. This may operate in a round robin, cycling through all available gain steps through use of control button 322. In other embodiments, adjusting the gain may be achieved in 1 dB increments and/or may include additional or alternative choices of control buttons, such as a "+" button and "−" button (not shown).

In addition, receiver unit 300 may include a safety channel when recording in mono audio mode. The safety channel may be used to create a copy of a mono audio signal from one or more transmitters at a lower level. In certain embodiments, the safety channel may facilitate choosing to create an audio signal from a specific transmitter unit be at a lower decibel level.

A user can engage link button 324 to commence a pairing procedure or connection procedure, depending on the wireless technology employed, between the receiver unit 300 and transmitter unit 200.

Figure 7:
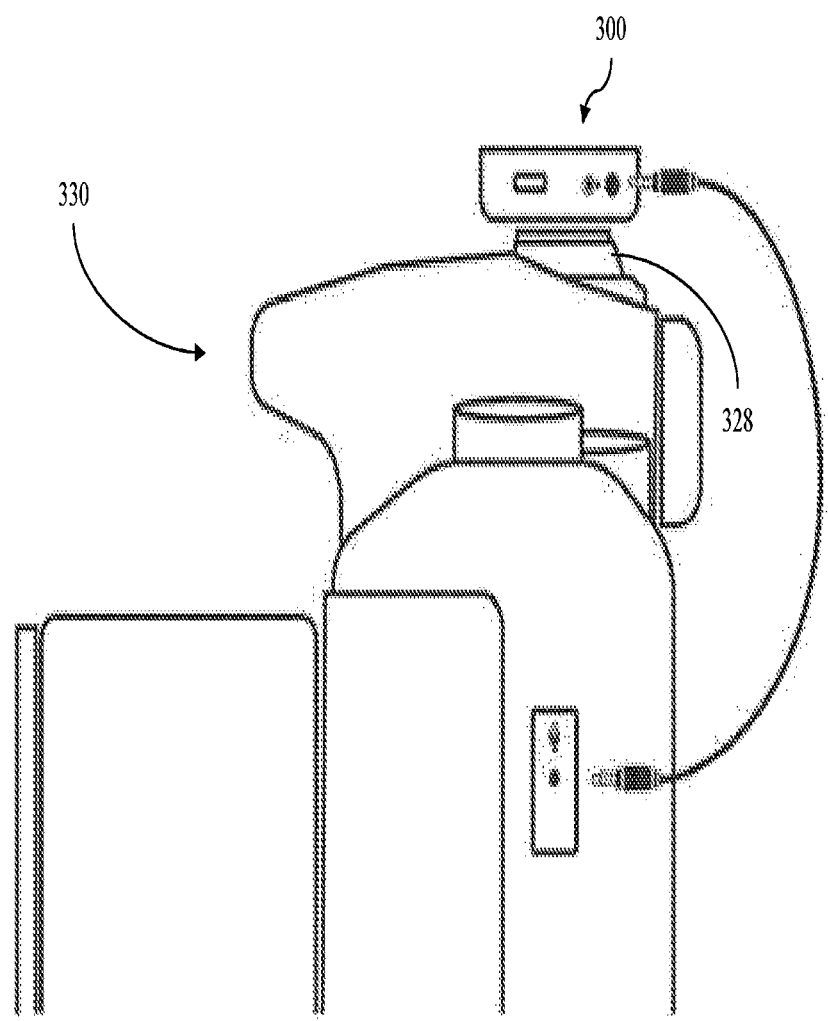
FIG. 7 illustrates an exemplary connection of the receiver unit to an external device.

As shown in FIGS. 6B, back surface 312 of transmitter unit may include a clip 312. Clip 312 may be a shoe clip, such as a hot-shoe clip or a cold-shoe clip, for securing to an external device. For example, as shown in FIG. 7, clip 322 may be used to secure to a shoe mount 328 of camera 330. Additional external devices that receiver unit may connect to include a smartphone, table, laptop, and the like. While a clip is shown, other connections are contemplated.

As shown in FIG. 6C, side surface 318 includes connector interfaces 314. Connector interfaces 314 communicate with various host devices via a wired communication path, e.g., using Universal Serial Bus (USB), universal asynchronous receiver/transmitter (UART), or other protocols for wired data communication. In some embodiments, connector interfaces 214 can provide a power port, allowing receiver unit 300 to receive power, e.g., to charge an internal battery.

Connector interfaces 314 can include a connector such as a 3.5 mm TRS (tip, ring, sleeve) or TRRS (tip, ring, ring sleeve) connector, a USB connector. mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. As shown in FIG. 7, the connector interface 308 may provide connections for audio and/or video signals, which may be transmitted to or from an external device, such as camera 330, in analog and/or digital formats.

In certain embodiments, connector interface 314 may include a USB device stack. USB device stack may be configured to perform USB Host OS detection by means of heuristic analysis of enumeration sequence. This may enable providing different capabilities and configurations to different operating systems. For example, the system may be configured to avoid exposing an iOS-specific interface, which may otherwise show up on a Window device as lacking a driver. In addition, the USB device stack may facilitate reassigning limited endpoint resources within a USB controller to interfaces relevant to a particular operating system.

Moreover, connector interface 314 may include a USB audio stack. USB audio stack may employ phantom terminal descriptors to, for example, work around unique limitations of certain Android implementations preventing an input-only USB device from working with an Android system audio stack.

2.2 Internal Components of Receiver Unit 300

Figure 8A:
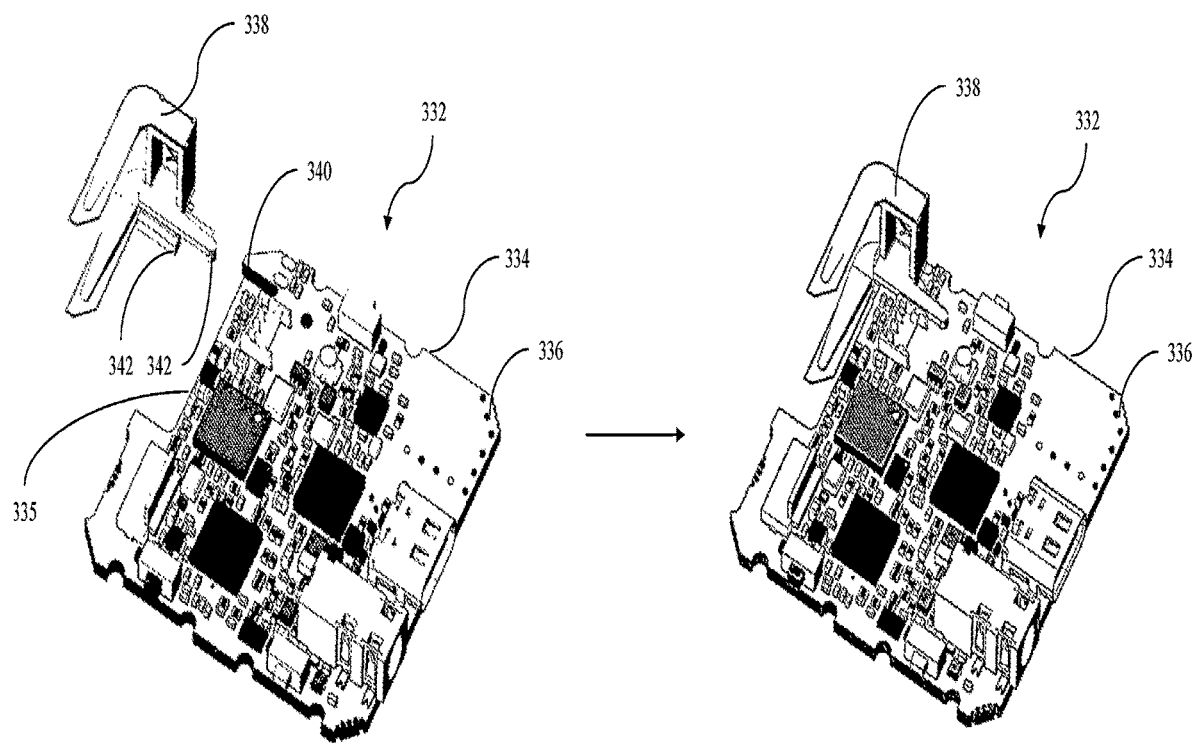
FIG. 8A illustrates a circuit board and antennas of the receiver unit of FIG. 1.
Figure 8B:
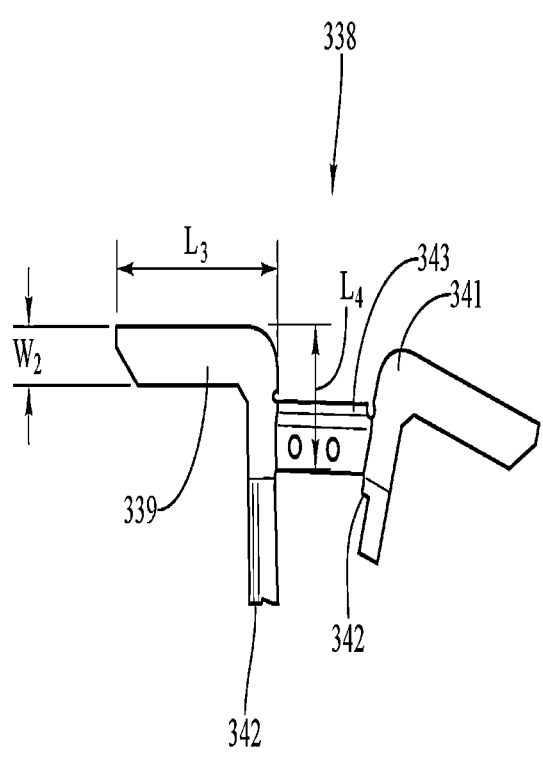
FIG. 8B illustrates a dipole antenna of the receiver unit.
Figure 8C:
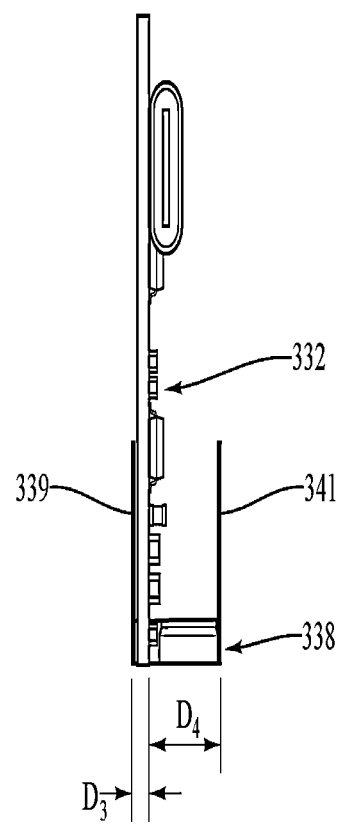
FIG. 8C illustrates a circuit board and dipole antenna of the receiver unit.
Figure 9:
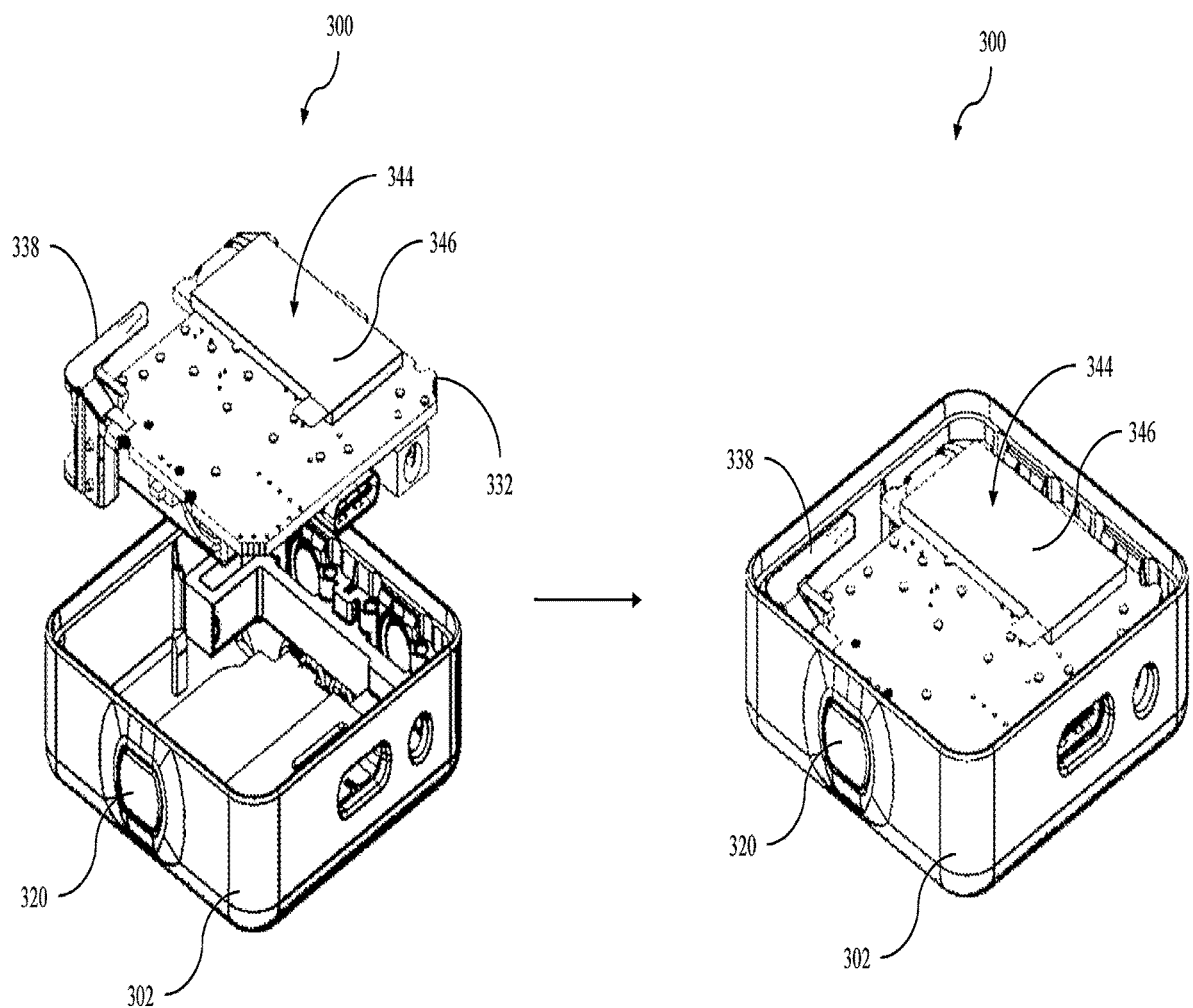
FIG. 9 illustrates mounting the circuit board and antenna within a housing of the receiver unit of FIG. 1.

FIGS. 8A, 8C, 9 illustrate a circuit board 332 of receiver unit 300. Circuit board 332 includes a ground plane 334. Circuit board 332 may have a thickness ranging between about half a millimeter and two millimeters, and preferably be about one millimeter.

Circuit board 332 may be a printed circuit board (PCB) or a flexible PCB. Flexible PCBs can be entirely flexible or can contain both flexible and rigid regions, where the rigid regions can be made of standard, rigid PCB materials with connections to the flexible portions of the overall PCB.

The flexible substrate can provide electrical traces, electrical connections and/or electrical pads on one or both primary surfaces of the flexible substrate. Examples of components that may communicate over one or more communication buses or signal lines of circuit board 332 may include a memory (which optionally includes one or more computer readable storage mediums), memory controller, one or more processing units, peripherals interface, RF circuitry, audio circuitry, microphone, input/output (I/O) subsystem, other input or control devices, and external ports.

Circuit board 332 may be rectangular with rounded corners and include a cut-out portion 335 for an antenna 338, as described below. In one embodiment, circuit board 332 is substantially square. Each linear dimensions of circuit board 332 may range from about twenty millimeters to about sixty millimeters in length, and preferably between about thirty millimeters and about fifty millimeters, and more preferably about forty millimeters. In other words, each linear dimension is preferably less than about sixty millimeters and still more preferably less than about fifty millimeters. Each linear dimension of circuit board 332 may correspond to and substantially fill the corresponding linear dimensions of the housing 302. Thus, circuit board 332 may fill at least approximately 90% of the corresponding internal linear dimensions of housing 302.

2.3 Antennas of Receiver Unit 300

Receiver unit 300 may include one or more antennas configured to, for example, receive an audio signal from transmitter unit 300. Antennas of receiver unit 300 may be made of a copper and/or thermoplastic material, such as polyvinyl chloride (PVC) having a lower carbon content or substantially no carbon content.

The one or more antennas may be a monopole antenna 336 and a folded dipole antenna 338. Antennas 336, 338 may be of different polarizations (horizontal/vertical) for adapting without losing performance due to the physical orientation of the receiver unit 300. The system may use a diversified antenna approach to actively scan and select the antenna that receives the strongest signal and operates within the least congested frequency band, such as the 2.4 GHz band.

Monopole antenna 336 may be an inverted-F antenna running parallel to ground plane 334 and grounded at one end. The polarization of monopole antenna 336 may be vertical, and the radiation pattern may be roughly torus or donut shaped.

As shown, circuit board 332 may include a slit 340 for receiving a folded dipole antenna 338. More specifically, folded dipole antenna 338 may include a connector portion 348 that is configured to fit inside slit 340 formed within circuit board 332. It is contemplated that folded dipole antenna 338 may include connector portions 342 soldered to, for example, corresponding regions on either side of circuit board 332.

Dipole antenna 338 may be disposed substantially opposite connector ports of the receiver unit 300 and on an edge of circuit board 332.

As shown in FIG. 8B, folded dipole antenna 338 may comprise a first conductive element 339 and a second conductive element 341 connected by a coupler 343. The distance between each conductive element 339, 341 may range between about five millimeters and about fifteen millimeters, and preferably be about ten millimeters.

As shown in FIGS. 8A-8C, dipole antenna 338 may be folded so that L-shaped conductive elements 339, 341 are positioned on either side of ground plane 334, thereby conserving space within receiver unit 300 while maximizing antenna size.

Each conductive element 339, 341 may be L-shaped and may include a tapered end. As shown, width (shown as $W_2$) of tapered end may range between about three millimeters and about five millimeters, and preferably between about three and a half millimeters and four millimeters, and in one embodiment may be about three and seven tenths millimeters.

As shown in FIG. 8B, legs 339a, 341a of each conductive element 339, 341 of folded dipole antenna 338 may have a length (shown as $L_3$) ranging between about ten millimeters and about thirty millimeters, and preferably between about fifteen millimeters and twenty millimeters. In one embodiment, the length $L_3$ is about seventeen millimeters. Each leg 339a, 341a may be positioned substantially parallel to ground plane 334 and each may be spaced a predetermined distance above or below ground plane 334.

The distance between legs 339a and 341a, when folded and positioned with respect to ground plane 334, may range between about five millimeters and about fifteen millimeters, and preferably be about ten millimeters. Cut-out 335 may eliminate circuit board material between legs 339a, 341a and thereby reduce interference.

As shown in FIG. 8B, another leg 339b, 341b of each conductive element 339, 341 of folded dipole antenna 338 may have a length (shown as $L_4$) ranging between about five millimeters and fifteen millimeters, and preferably between about seven millimeters and ten millimeters. In one embodiment, the length $L_4$ is about eight and a half millimeters. Each leg 339b, 341b may be positioned substantially normal to ground plane 334 and extends a predetermined distance from ground plane 334.

Dipole antenna 338 may be a polarized antenna array. It is contemplated that dipole antenna 338 may include a plurality of horizontally polarized antenna arrays coupled to a vertically polarized antenna array. The vertically polarized antenna array may generate a radiation pattern substantially perpendicular to a radiation pattern generated by one of the horizontally polarized antenna arrays.

As illustrated in FIG. 8C, folded dipole antenna 338 in receiver unit 300 may be decoupled (i.e., positioned at a height) from either side of ground plane 334. The distance between dipole antenna 338 and ground plane 334 may range between about one millimeter and a ten millimeters. In one embodiment, folded dipole antenna 338 may be positioned on circuit board 332 that a first conductive element 339 of dipole antenna 338 is distanced (shown as $D_3$) between about one millimeter and about two millimeters from ground plane 334, and the second conductive element 341 of dipole antenna 338 is distanced (shown as $D_4$) is distanced between about seven millimeter and about eight millimeters from ground plane 334. The separation from ground plane 334 may decrease signal loss and thereby lower the rate of dropout error.

2.4 Power System of Receiver Unit 300

As shown in FIG. 9, a power system 344 is mounted within housing 202 of receiver unit 300. Power system 344 may be used for powering the various components of receiver unit 300. Power system 344 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in receiver unit 300.

A battery 346 of receiver unit 300 may be a lithium ion polymer rechargeable battery. In certain embodiments, battery 346 is a 3.8V 350 mAh 1.33 Wh Tenergy Model 34363 R battery.

A height of battery 346 may range between about fifteen millimeters and thirty millimeters, and preferably between about twenty millimeters and twenty five millimeters. In one embodiment, the height of battery 346 is about twenty two millimeters.

A length of battery 346 may range between about ten millimeters and twenty five millimeters, and preferably between about fifteen millimeters and twenty millimeters. In one embodiment, the height of battery 346 is about eighteen millimeters.

3.0 Exemplary Block Diagrams

Figure 10:
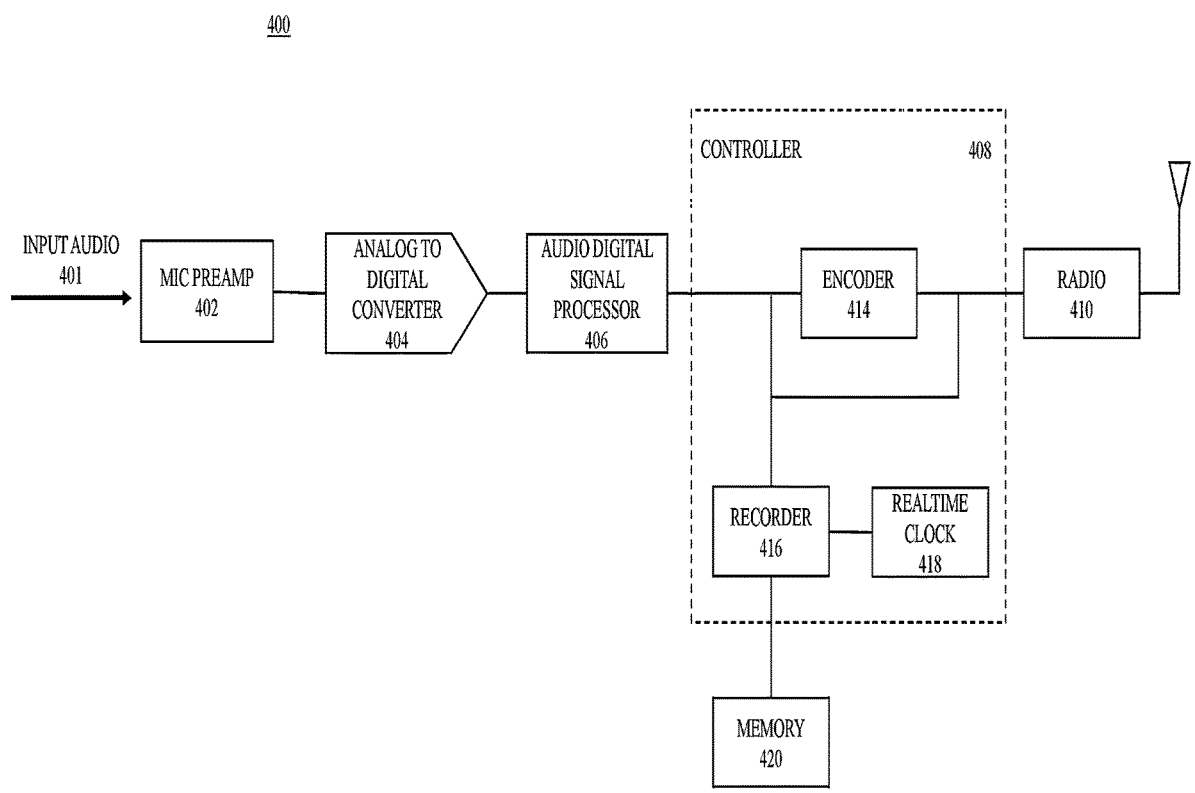
FIG. 10 is a block diagram illustrating a portion of the transmitter unit.
Figure 11:
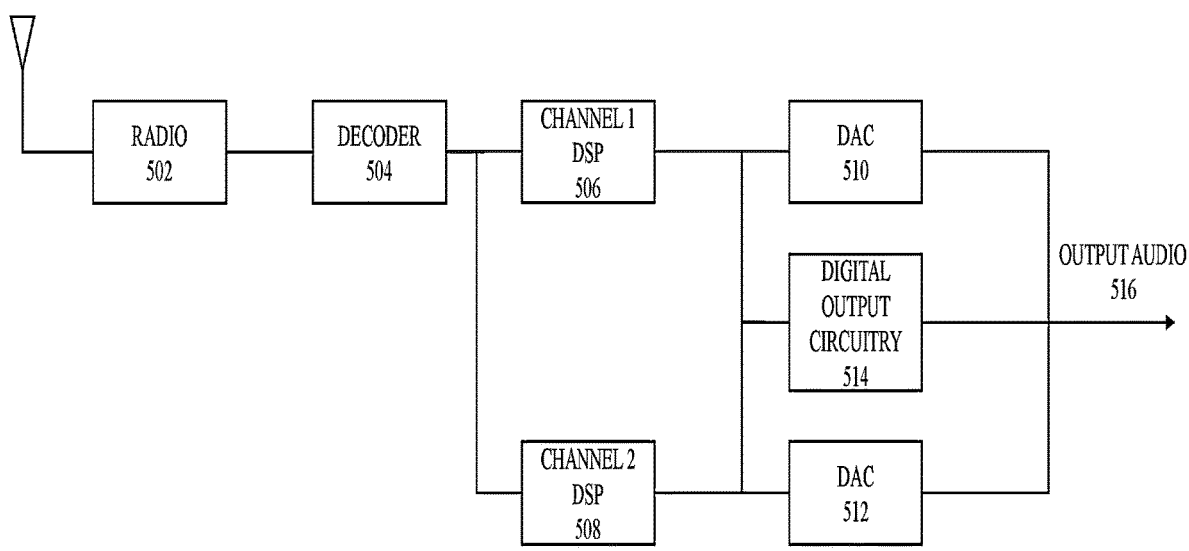
FIG. 11 is a block diagram illustration a portion of the receiver unit.
Figure 12:
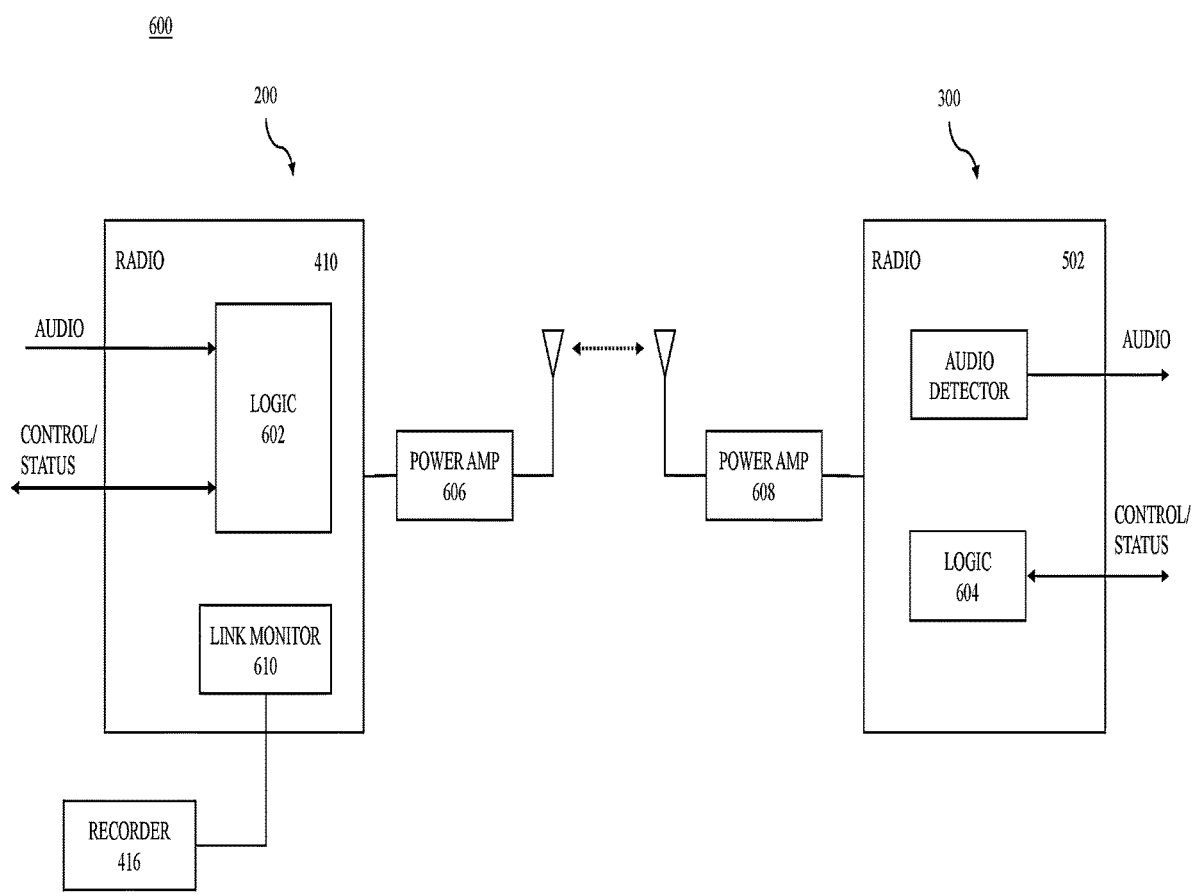
FIG. 12 is a block diagram illustration portions of the transmitter unit and the receiver unit.

FIG. 10 is a block diagram 400 of transmitter unit 200. FIG. 11 is a block diagram 500 of receiver unit 300. FIG. 12 is a block diagram 600 of an exemplary wireless microphone system.

3.1 Exemplary Block Diagram 400 of Transmitter 200

As shown in FIG. 10, transmitter unit 200 may include a mic preamp 402, an analog to digital converter (ADC) 404, an audio digital signal processor (DSP) 406, a controller 408, a radio module 410.

Mic preamp 402 may be a low noise amplifier with low-voltage operation. Mic preamp 402 may be formed of a field-effect transistor and/or a bipolar junction transistor, such as a PNP transistor. The amplification of audio may be performed to the optimum input necessary. A variable resistor of the mic preamp may facilitate adjusting gain.

ADC 404 may receive a pre-amplified analog audio signal 401 output from preamp 402. ADC 404 may include any suitable system device or apparatus configured to convert the pre-amplified analog audio signal received at its input to a digital signal representative of the analog audio signal. ADC 404 may itself include one or more components including, but not limited to, a delta-sigma modulator and a decimator.

Once converted, the digital signal may be transmitted over significantly longer distances without being susceptible to noise as compared to an analog transmission over the same distance.

DSP 406 may include any suitable system, device, or apparatus configured to process the digitized signal for use in a digital audio system. For example, DSP 406 be configured to interpret and/or execute program instructions and/or process data.

Controller 408 may receive the digitized audio signal from DSP 406. Controller 408 may include an encoder 414, a recorder 416, and a realtime clock 418. Encoder 414 may be configured to compresses the audio signal. For example, the signal may be compressed to one half or less using a logarithmic compression.

Recorder 416 may be configured to record the audio signal according to a processing path via a switching arrangement of the transmitter unit 200. A first processing path includes recording the raw audio signal prior to compression. A second processing path includes compressing the audio signal, via encoder 414, and recording the compressed audio signal.

Further, recorder 416 may record a peak audio file. Peak audio files may include a low resolution signal that indexes the shape of the audio waveform to aid in displaying the waveform via, for example, a software component of the system. In other words, the peak audio file may be used to output a visual the audio file on a display. The output of the entire audio waveform allows for more efficient editing of the audio.

The recording, either according to the first processing path or the second processing path, may then be tagged through on realtime clock 418. In particular, realtime clock 418 may monitor temporal information, such as the day, date, hour, minute, and second the recording was started and stopped. That information is then used to tag the audio signal and/or the peak file. For example, the system may, automatically or in response to a user input, mark a portion of the audio file to identify audio dropouts.

The tagged audio recording may then be stored in a memory 420. Memory 420 may be any suitable non-volatile, non-transitory, memory such as, a high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices.

As shown in FIG. 10, transmitter unit 200 may utilize the same audio data, compressed or raw audio, for both recording and transmitting via radio antenna 410, which is described in further detail below.

3.2 Exemplary Block Diagram 500 of Receiver 300

As shown in FIG. 11, receiver unit 300 may include a radio module 502, a decoder 504, DSPs 506, 508 corresponding to the channel of the audio data, digital to analog converters (DAC) 510, 512, and digital output circuitry 514.

Radio antenna 502 is configured to receive digitized audio data from transmitter 200, as detailed below. Decoder 504 may receive the audio data and be configured to decode the audio compression codec corresponding to encoder 414.

As shown, the audio data may then be directed to a DSP 506, 508 corresponding to the channel of the recording, e.g., the transmitter unit the audio was received from. DSP 508 corresponds to Channel 2 and may be used when receiver unit is linked to a second transmitter unit. If a second transmitter unit is linked, audio may be received from the left and right channel separately, or mixed together in mono. If mixed together into mono, the safety channel may be available on the right channel. The outputs may be left and right from, for example, a TRS analogue output, or channel 1 and 2 of the USB digital audio output (USB digital output does not pass through a DAC). DSPs 506, 508 may include any suitable system, device, or apparatus configured to process the audio data for output. For example, DSPs may facilitate processing the audio in realtime to provide equalization, compression, and the like.

DACs 510, 512 may receive the digitized audio from a corresponding DSP 506, 508. DACs 510, 512 may include any suitable system device or apparatus configured to convert the digitized audio received to an analog format for output 516 to an external device.

Digital output circuitry 514 may be adapted for coupling directly to other devices or indirectly over a network (e.g., the Internet, wireless LAN, etc.). In some embodiments, the external port is a multi-pin (e.g., 30-pin) connector or USBC connector that is the same as, or similar to and/or compatible with various devices, such as Android and iOS devices and corresponding accessory cables. Digital output circuitry 514 may output audio 516 in a digital format.

3.3 Exemplary Block Diagram 600 of Wireless Microphone System 100

As shown in FIG. 12, radio module 410 of transmitter unit 200 may communicate with radio module 502 receiver unit 300 over a wireless link. As detailed above, data communication may be implemented over a wireless medium, e.g., 2.4 GHz with 128 bit encryption, Wi-Fi (IEEE 802.21 family standards), Bluetooth® (a family of standards promulgated by Bluetooth SIG, Inc.), or other protocols for wireless data communication. In certain embodiments, transmitter unit may transmit the same audio pack 8 time and have a maximal output RF power of about 10 mW or less.

Radio modules 410, 502 may include logic 602, 604 configured to, for example, process audio, controls, and status, such as link status, audio level information, battery health, and charge status. Logic 602, 604 may be a single component or may be implemented as any combination of DSPs, ASICs, FPGAs, CPUs running executable instructions, GPUs running executable instructions, hardwired circuitry, state machines, etc., without limitation. Therefore, as one example, the logic may be implemented using an ASIC or an FPGA. In another example, the logic may be a combination of hardware and software or firmware executed by a processor, etc.

Moreover, radio modules 410, 502 may include power amps 606, 608 configured to amplify low-power audio signals. Other contemplated components may include, a tuner and one or more oscillators.

Radio module 410 further includes a link monitor 610 operatively coupled to recorder 416 of transmitter unit 200. Link monitor 610 is operative to monitor the wireless link connection between the transmitter unit 200 and the receiver unit 300. In response to detecting a drop in the connection by link monitor 610, a recorder, such as recorder 416, may be configured to mark an audio peak file, as detailed above.

4.0 Flow Chart 700 of Exemplary Transmitter Unit

FIG. 13 illustrates a flow chart 700 of an exemplary transmitter unit of a wireless microphone system. The method of operation begins and, at step 702, the transmitter unit receives audio. The audio may be obtained via a built-in microphone of the transmitter unit or via an external microphone wired to the transmitter unit.

In step 704, transmitter unit may compress the received audio via, for example, an encoder. In decision step 706, transmitter unit may determine whether to record the audio. If yes, in decision step 708, transmitter unit may determine whether to record the audio in a compressed format. If at decision step 708, transmitter unit determines that the compressed audio should be recorded, at step 710, the compressed audio is recorded. If at decision step 708, transmitter unit determines that the raw audio should be recorded, at step 710, the raw audio is recorded.

If, at decision step 706, transmitter unit determines that no audio should be recorded or after the audio is recorded in a selected format, in decision step 714, transmitter unit will determine whether to transmit the audio. If yes, in decision step 716, transmitter unit will determine whether a receiver unit is available. If, at decision step 716, transmitter unit determines that a receiver unit is available, in step 718, the two devices may be paired. In step 720, transmitter unit will transmit the compressed audio to receiver unit.

In decision 722, transmitter unit will determine whether the connection link between transmitter unit and receiver unit has been broken. If, at decision step 722, transmitter unit determines that the link is not broken, in decision step 724, transmitter unit will determine if an input is received to tag, if recorded, the audio file and/or a peak audio file with a marker.

If, at decision step 722, transmitter unit determines that the communication link is broken, in step 724, transmitter unit will tag, if recorded, the audio file and/or a peak audio file with a marker corresponding to the dropped connection.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Components may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

The invention claimed is:

1. A device for transmitting and recording audio, comprising:
   a circuit board including a ground plane, the ground plane including a first side and a second opposite side;
   a folded dipole antenna operatively coupled to said circuit board, said antenna having a first conductive element spaced a predetermined distance from the first side of the ground plane and a second conductive element spaced a predetermined distance from the opposite side of the ground plane.

2. The device of claim 1, wherein each of the conductive elements is L-shaped and includes a horizontal leg and a vertical leg.

3. The device of claim 2, wherein each horizontal leg is less than about thirty millimeters in length.

4. The device of claim 2, wherein each vertical leg is less than about ten millimeters in length.

5. The device of claim 2, wherein said horizontal legs of said first conductive element are distanced between about seven millimeters and about ten millimeters from the ground plane.

6. The device of claim 2, wherein said vertical legs of said second conductive element is distanced between about one millimeter and about two millimeters from the ground plane.

7. The device of claim 2, wherein a distance between horizontal legs of said first conductive element and vertical legs of said second conductive elements is between about five millimeter and about fifteen millimeters.

8. The device of claim 1, wherein said first and said second conductive elements are coupled via a coupler, said coupler having a length of about eight millimeters.

9. The device of claim 1, wherein said circuit board further includes a slit configured to receive said dipole antenna.

10. The device of claim 1, wherein said circuit board further includes a monopole antenna running parallel to said ground plane.

* * * * *